United States Patent
Liu et al.

(10) Patent No.: US 6,433,303 B1
(45) Date of Patent: Aug. 13, 2002

(54) METHOD AND APPARATUS USING LASER PULSES TO MAKE AN ARRAY OF MICROCAVITY HOLES

(75) Inventors: Xinbing Liu, Acton, MA (US); Mamoru Takeda, Kyoto; Hisahito Ogawa, Nara, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,640

(22) Filed: Mar. 31, 2000

(51) Int. Cl.[7] .................... B23K 26/067; B23K 26/073; B23K 26/06
(52) U.S. Cl. .............. 219/121.7; 219/121.74; 219/121.75; 219/121.76; 219/121.77
(58) Field of Search ............... 219/121.7, 121.71, 219/121.73, 121.74, 121.75, 121.85, 121.76, 121.77

(56) References Cited

U.S. PATENT DOCUMENTS

| | | | |
|---|---|---|---|
| 4,322,600 A | * | 3/1982 | Crahay |
| 4,734,558 A | * | 3/1988 | Nakano et al. |
| 4,937,424 A | * | 6/1990 | Yasui et al. |
| 5,168,454 A | | 12/1992 | LaPlante et al. |
| 5,296,673 A | * | 3/1994 | Smith |
| 5,367,143 A | * | 11/1994 | White, Jr. |
| 5,376,771 A | * | 12/1994 | Roy |
| 5,414,239 A | * | 5/1995 | Terabayashi et al. |
| 5,596,594 A | * | 1/1997 | Egawa |
| 5,676,866 A | | 10/1997 | In den Baumen et al. |
| 5,792,411 A | * | 8/1998 | Morris et al. |
| 5,948,289 A | * | 9/1999 | Noda et al. |
| 5,955,839 A | | 9/1999 | Jaffe et al. |
| 6,038,075 A | | 3/2000 | Jamazaki et al. |
| 6,040,552 A | | 3/2000 | Jain et al. |
| 6,058,132 A | * | 5/2000 | Iso et al. |
| 6,087,625 A | * | 7/2000 | Iso |
| 6,120,976 A | * | 9/2000 | Treadwell et al. |
| 6,172,329 B1 | * | 1/2001 | Shoemaker et al. |
| 6,184,490 B1 | * | 2/2001 | Schweizer |
| 6,208,458 B1 | * | 3/2001 | Galvanauskas et al. |
| 6,211,485 B1 | * | 4/2001 | Burgess |
| 6,215,099 B1 | * | 4/2001 | Livshits |

FOREIGN PATENT DOCUMENTS

DE          19744368 A1  *  5/1999

* cited by examiner

*Primary Examiner*—Tom Dunn
*Assistant Examiner*—Colleen P. Cooke
(74) *Attorney, Agent, or Firm*—RatnerPrestia

(57) ABSTRACT

A method and apparatus for forming an array of microcavities in the surface of a metal film uses an excimer laser or an ultrashort laser which to produce a beam of laser light pulses. An optical mask divides the beam into multiple beams and a lens system focuses the multiple beams onto the metal film. The device operates by generating multiple beams of laser pulses of a first diameter and then magnifying the pulses by a magnification factor less than 1 to produce multiple beams of pulses having a second diameter, less than the first diameter, which are applied to the metal film. The magnification factor and the intensity of the laser is such that the fluence of the laser on the optical mask is not sufficient to cause ablation while the fluence on the metal film is sufficient to cause ablation. A diffractive optical element may be used in the device in place of the optical mask. The apparatus includes a quarter wave plate that converts the beam of laser light pulses into a beam of circularly polarized pulses. The apparatus also includes a device that homogenizes the intensity of the laser light pulses before they are applied to the optical mask.

23 Claims, 4 Drawing Sheets

METHOD AND APPARATUS USING LASER PULSES TO MAKE AN ARRAY OF MICROCAVITY HOLES

BACKGROUND OF THE INVENTION

The present invention concerns laser micromachining and, in particular, using laser pulses to form a microcavity array in a metal foil.

Incandescent light sources rely on the emission of radiation by a hot material. Incandescent light sources, such as a filament of a conventional light bulb, emit only a relatively small portion of their energy in the form of visible light. Most of the remainder of the emitted energy is in the infrared region of the spectrum. In addition, the filament emits light in all directions.

One method for reducing the infrared emissions on an incandescent light source is to use an optical microcavity, as described in U.S. Pat. No. 5,955,839 entitled INCANDESCENT MICROCAVITY LIGHTSOURCE HAVING FILAMENT SPACED FROM REFLECTOR AT NODE OF WAVE EMITTED. In this patent, conventional microelectronic processing techniques are used to form a filament in a single optical microcavity. As described in this patent, the presence of the optical microcavity provides greater control of the directionality of emissions and increases the emission efficiency in given bandwidth (i.e. the 1–2 $\mu$m near infrared band).

The same type of efficiency gain may be obtained by forming an array of microcavity holes in an incandescent light source. Such a light source may, for example, have microcavities of between 1 $\mu$m and 10 $\mu$m in diameter. While features having these dimensions may be formed in some materials using standard microelectronic processing techniques, it is difficult to form them in metals such as tungsten that are commonly used as incandescent filaments.

SUMMARY OF THE INVENTION

The present invention is embodied in a method and apparatus for forming an array of microcavities on the surface of a workpiece. The apparatus includes a laser which produces a beam of laser light pulses, a device that divides the beam into multiple beams and a lens system that focuses the multiple beams onto the workpiece.

According to one aspect of the invention, the apparatus operates by generating multiple beams of laser pulses of a first diameter and then magnifying the pulses by a magnification factor less than 1 before applying the magnified beams of laser pulses to the workpiece.

According to another aspect of the invention, the laser is an excimer laser;

According to yet another aspect of the invention, the laser is an ultrashort pulse laser;

According to another aspect of the invention, the beam dividing device is an opaque mask having a pattern of openings.

According to a further aspect of the invention the beam dividing device is a diffractive optical element.

According to yet another aspect of the invention, the apparatus includes a quarter wave plate that converts the beam of laser light pulses into a beam of circularly polarized pulses.

According to a further aspect of the invention, the apparatus includes a device that homogenizes the intensity of the laser light pulses before they are applied to the workpiece.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

The present invention is embodied in a method apparatus that uses a laser to form high-quality microcavities in metal films. The laser may be either an ultrashort pulse laser of a pulsed excimer laser. A typical commercial amplified ultrashort laser system using Ti:sapphire crystal as the gain medium produces laser pulses with ≈100 fs pulse width. As amplified femtosecond laser pulses contain microjoules to millijoules of energy, the peak power is tremendous. For example, a 100-fs pulse with pulse energy of only 0.1 mJ has peak power of $P_{peak}=(10^{-4}/10^{-13})$ W=1 GW. One such laser system is the Clark-MXR CPA 2000 device. This laser system uses the Chirped Pulse Amplification technique to provide sub-picosecond pulses at a wavelength of 775 nm.

An exemplary KrF excimer laser provides pulses with approximately 20 nanosecond pulse widths, maximum pulse energy of 250 mJ, a maximum pulse rate of 200 Hz and a wavelength of 248 nm. One such laser system is the Lambda Physik unstable-resonator excimer laser.

Ultrashort pulse lasers are lasers that have pulse widths and intensities that combine to produce a laser fluence which ablates the material being processed in a highly localized manner. Ultrashort pulse lasers are characterized by a precise ablation threshold and the virtual absence of heat diffusion into the substrate material. Minimal heat diffusion means that there is only a minimal heat affected zone surrounding the drilled holes. Typically, these lasers have pulse widths that are less than 10 picoseconds.

Figure 1:
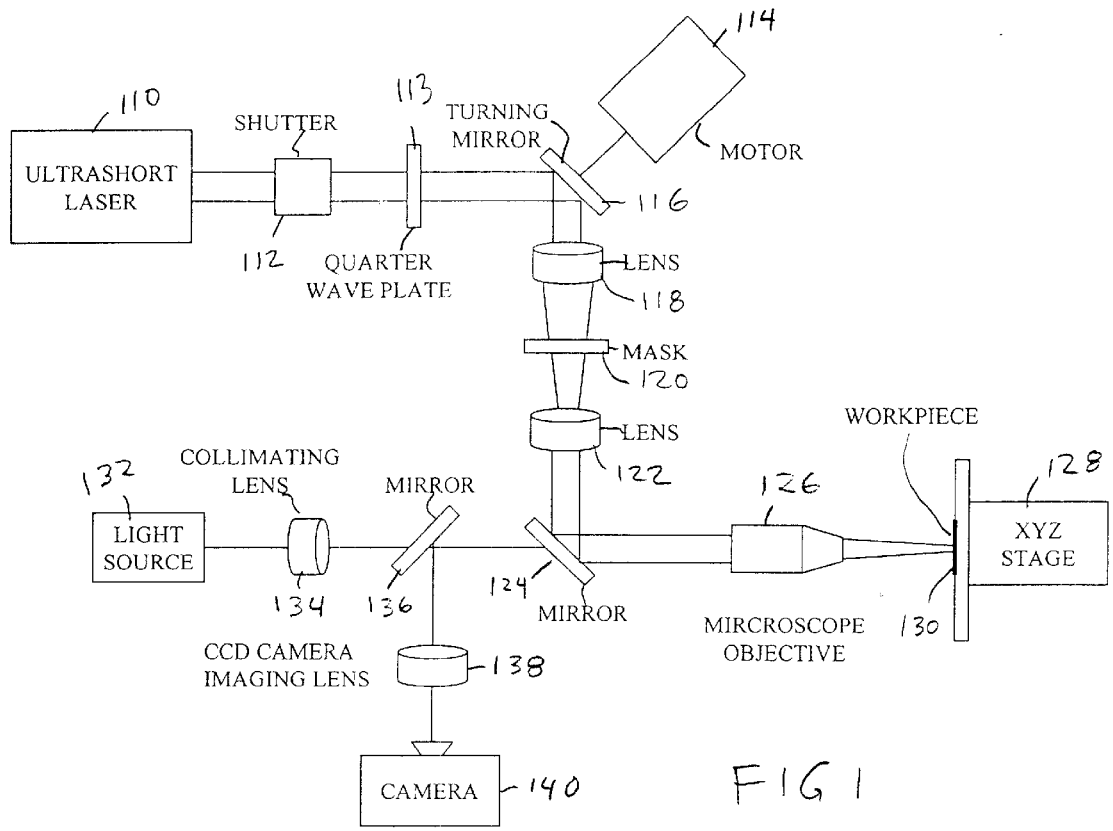
FIG. 1 is a block diagram of a first exemplary optical system that includes an embodiment of the present invention.

An exemplary micromachining system according to the present invention is shown in FIG. 1. The laser beam from a laser 110 is first passed through a mechanical shutter 112. This shutter allows the beam to be turned off, for example, when the workpiece is being moved, without turning off the laser 110. The laser beam provided by the shutter is passed through a quarter-wave plate 113. The quarter-wave plate 113 changes the polarization of the laser beam from linear to circular polarization, which the inventors have determined is desirable for drilling round holes. The circularly polarized beam is then reflected from a turning mirror 116 that is coupled to a motor, as described below. The reflected beam is then passed through a lens 118 to increase the laser fluence on the mask 120. The imaging of the mask onto the workpiece is realized by a two-lens system including lenses 122 and 126. The mask is placed approximately in the focal plane of the lens 122, and the workpiece is placed in the focal plane of the lens 126. In the exemplary apparatus, is a half-silvered turning mirror 124 is placed between the lenses 122 and 126.

Using this lens system, the image magnification ratio is given by the ratio of the focal length of the two lenses, $M=f_2/f_1$. This imaging arrangement collimates the beam between the two imaging lenses, and, so, is not sensitive to the separation of the two lenses. The workpiece 130 is mounted on an XYZ translation stage 128. The exemplary stage 128 is controlled by a computer, which also controls and synchronizes the shutter 112 so that the beam is not projected onto the workpiece 130 when the workpiece is being moved. The XYZ translation stage 128 is used instead of an XY translation stage to be able to adjust the position of the workpiece to place the surface of the workpiece that is to be ablated at the focal plane of the lens 126. Thus, during the machining process, the translation stage 128 may step in the Z direction to place the surface of the workpiece 130 or the bottom surface of the partially ablated hole at or near the focal plane of the lens 126.

The turning mirror 124 before the objective lens allows a microscope imaging setup including CCD camera imaging lens 138 and CCD camera 140 to monitor the drilling process in real time. A fiber-optic coupled lamp, 132 and collimating lens 134 illuminate the sample through the turning mirror 136 and the objective lens 126.

In this exemplary embodiment of the invention, when an ultrashort laser is used, the laser pulse energy is approximately 800 $\mu$J, the pulse width of the beam is approximately 150 femtoseconds and the pulse repetition frequency is approximately 1 kHz to achieve an average power of 0.8 watts. The number of pulses used to form each hole ranges from several tens to several thousands. When an excimer laser is used, the pulse energy is approximately 50 mJ. To drill the holes, 400 pulses at a having a pulse width of 20 ns and a repetition frequency of 186 Hz were applied, resulting in a total exposure time of 2.15 seconds for each hole.

The laser fluence on workpiece 130 may be varied by changing the position of the lens 113 relative to the mask 120, hence changing the fluence of the laser beam on the mask.

Because the exemplary apparatus shown in FIG. 1 drills multiple holes in parallel, it is important that the laser beam be uniform over the portion of the mask area having the aperture holes. In the exemplary embodiment of the invention, this is achieved in two steps. First, the diameter of the laser beam on the mask is somewhat larger than the diameter of the pattern of aperture holes. Second, the apparatus shown in FIG. 1 includes a device that homogenizes the beam. This device includes the turning mirror 116 and the motor 114. The mirror 116 is mounted on the motor 114 so that it can be rotated continuously around the axis normal to the mirror surface. The mirror 116 is also tilted slightly. This makes the laser beam reflected off the mirror exhibit a "wobbling" behavior. That is to say, it traces a circular pattern on the mask 120. The motor 114 and tilted turning mirror 116 thus act as a beam homogenizer for the laser beam.

Although one exemplary beam homogenizing technique has been disclosed, it is contemplated that other techniques may be employed in place of or in addition to the technique shown. For example, a holographic beam shaper (not shown) may be used to enhance the uniformity of the beam across the mask. Alternatively, or in conjunction with the holographic beam shaper, a diffractive optical element (DOE) may be used in place of the mask 120. An exemplary embodiment of the invention employing a DOE is described below with reference to FIG. 3. As another alternative embodiment, an inhomogeneous beam may be used and the openings in the mask may be modulated (i.e. by a partial shutter) to block, for example, the central portion of the mask, when the holes corresponding to that portion have been drilled, allowing additional pulses to strike the workpiece 130 at locations corresponding to the weaker beams passed by the outer regions of the mask 120.

Figure 2:
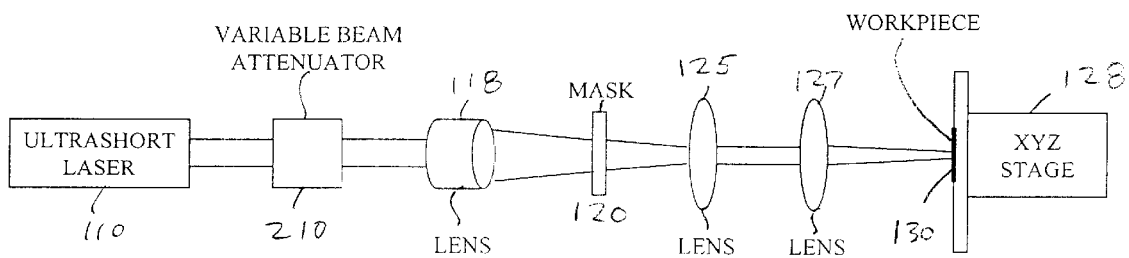
FIG. 2 is a block diagram of a second exemplary optical system that includes an embodiment of the present invention.

FIG. 2 is a block diagram showing a second exemplary embodiment of the invention. This embodiment assumes that the laser beam is sufficiently homogenous over the aperture mask to produce uniform microcavity holes in the workpiece. In this embodiment, a laser source 110 emits a beam consisting of a train of pulses. The laser beam passes through a variable beam attenuator 210. Following the attenuator, the beam is weakly focused by the lens 118 to illuminate the mask 120.

An optical imaging system including the lenses 125 and 127 images the open apertures onto the workpiece 130 which is held by an XYZ translation stage 128. The image magnification of the imaging system may be represented by a variable M. The system shown in FIG. 2 forms, on the workpiece 130, a pattern of laser light distribution that is substantially the same as the apertures in the mask 120 but magnified in its linear dimensions by a factor of M. The diameter d of each laser light spot formed on the workpiece 130 is given by equation (1).

$$d=MD \qquad (1)$$

and the linear separation, l, between adjacent light spots is given by equation (2).

$$l=ML \qquad (2)$$

Ignoring any losses that may exist in the imaging system, the laser intensity $I_2$ at the surface of the workpiece 130 is related to the intensity, $I_1$ of the laser beam at the mask 120 by equation (3).

$$I_2=I_1/M^2 \qquad (3)$$

When the intensity of the laser beam projected on to the workpiece 130 exceeds the ablation threshold of the metal, a pattern of holes is drilled into the metal by laser ablation. The number of pulses used to drill the pattern depends on the intensity of the laser beams at the workpiece 130 and the desired depth of the holes. The pattern drilled into the workpiece 130 is essentially the same as the pattern on the mask but with a linear magnification of M. To drill a larger area with the same pattern of holes in the workpiece, the workpiece is translated and the laser drilling is performed using a step and repeat process.

In both of the exemplary embodiments described above, the laser beam illuminates the surface of the mask 120 and thus, has the potential to damage the mask. In order to minimize this damage, the exemplary mask is made from a material that is relatively resistant to laser damage, for example molybdenum (Mo). More importantly, the magnification factor M is selected to be less than one. An exemplary value is M=0.1. In this instance, the intensity of the laser beam at the work piece is 100 times the intensity at the surface of the mask 120. The laser intensity may be adjusted, for example, using the variable attenuator 210, so that ablation takes place at the workpiece 130 but not at the mask 120.

Figure 3:
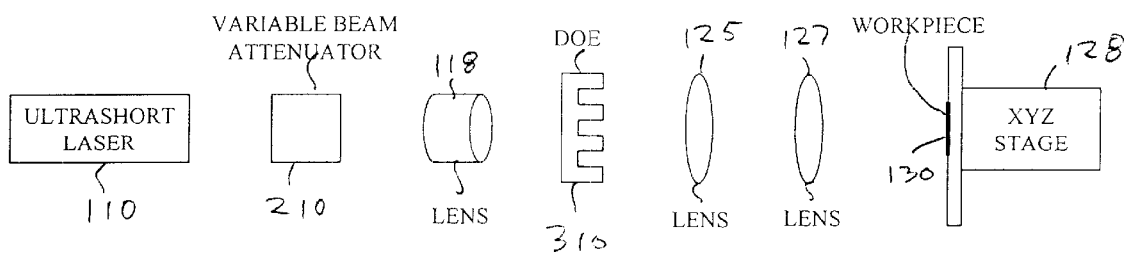
FIG. 3 is a block diagram of a third exemplary optical system that includes an embodiment of the present invention.

FIG. 3 is a block diagram of a third exemplary embodiment of the invention. This embodiment is the same as the embodiment shown in FIG. 2 except that a diffractive optical element (DOE) 310 is used in place of the mask 120. One advantage of using a DOE is the more efficient utilization of laser energy. When an opaque mask with open apertures is used to generate multiple beams for simultaneous drilling, the opaque areas block the incident laser beam and, so, reduce the laser energy available at the workpiece 130. A DOE, however, modulates the phase of the laser beam but does not block the beam. A DOE can be designed and fabricated to generate, together with a focusing lens, the desired pattern at the surface of the work piece 130. In addition, the DOE may be combined with a holographic beam shaper to produce multiple parallel beams at the surface of the workpiece 130 that have substantially the same energy profile.

Figure 4:
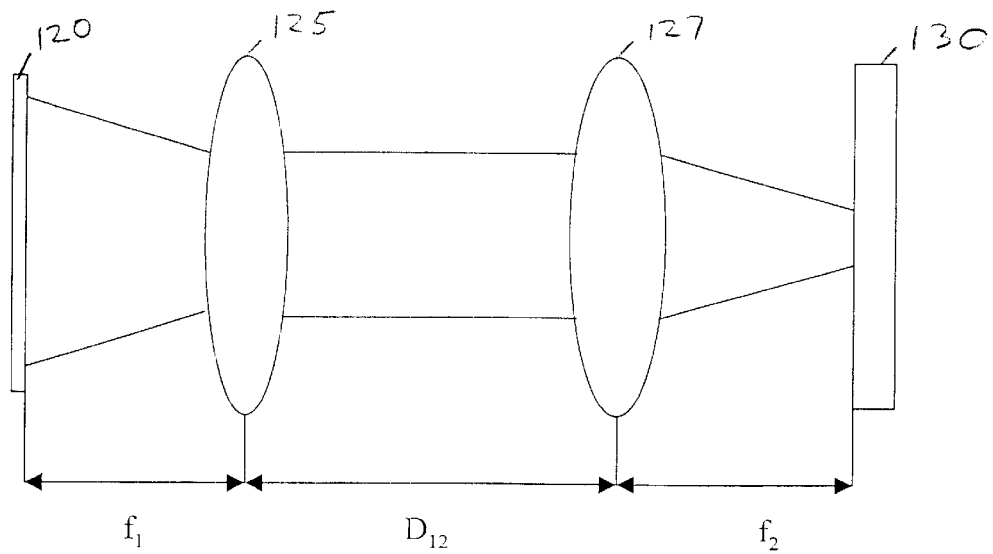
FIG. 4 is a block diagram of a focusing lens system that may be used in any of the embodiments shown in FIGS. 1, 2 and 3.

FIG. 4 is a block diagram that illustrates an exemplary imaging system that transfers the image of the mask 120 onto the workpiece 130. The exemplary imaging system consists of two lenses, 125 and 127. The first lens 125 has a focal length of $f_1$ and the second lens 127 has a focal length of $f_2$. The imaging system is configured so that lens 125 is placed at a distance f1 from the mask 120 (i.e. the mask is positioned in the front focal plane of the lens 125) and the workpiece 130 is placed at a distance $f_2$ from the lens 127 (i.e. the workpiece is positioned in the back focal plane of the lens 127). In this configuration, the magnification M of the imaging system is given by equation (4).

$$M=f_2/f_1 \quad (4)$$

In this configuration, the distance $D_{12}$ between the lenses 125 and 127 may be varied without substantially affecting the imaging apparatus. In the exemplary embodiment of the invention, $f_1$=20 cm and $f_2$=2 cm for a magnification factor M of 0.1.

Figure 5:
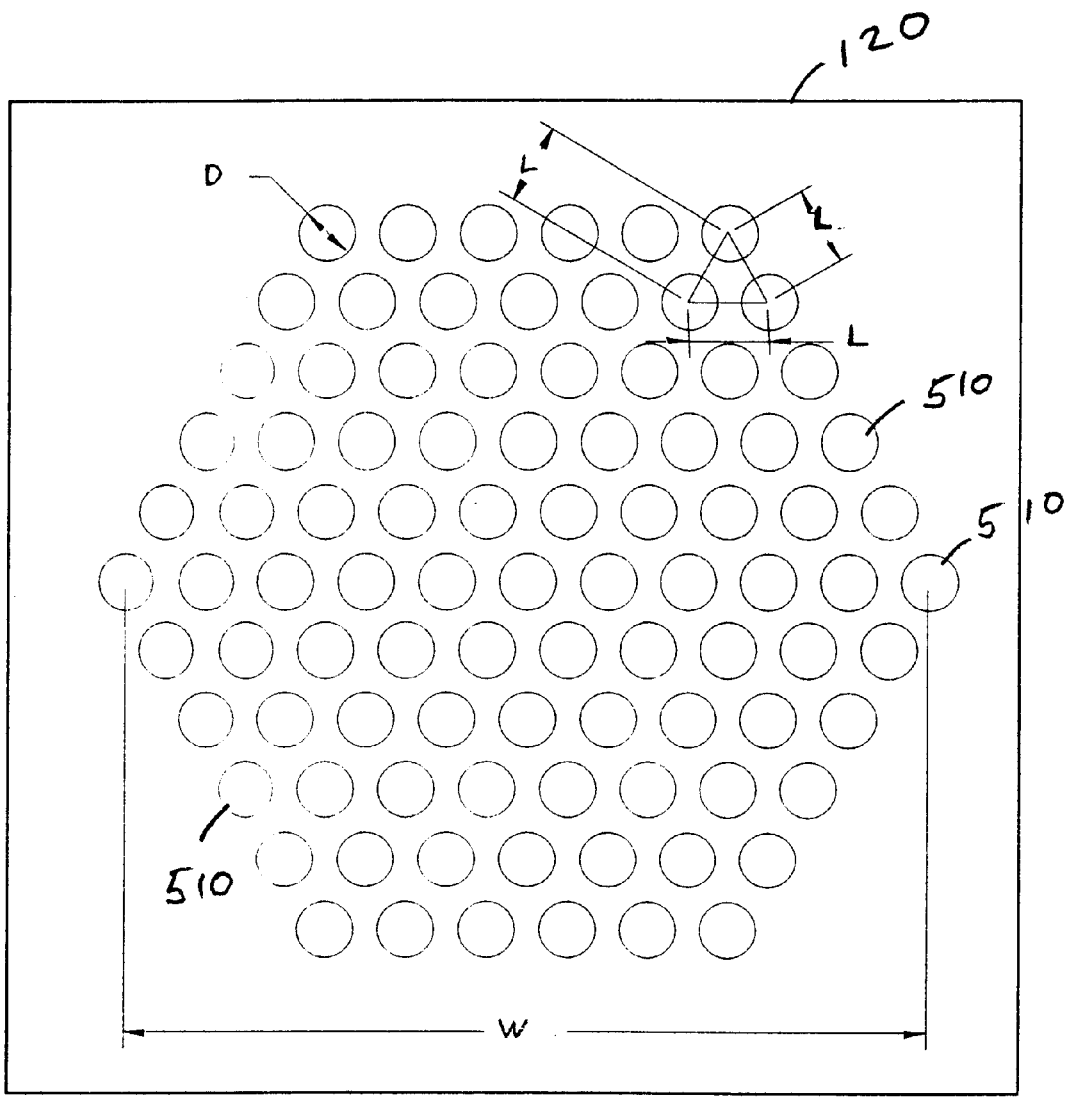
FIG. 5 is a front-plan view of an exemplary mask that may be used in either of the embodiments of the invention shown in FIGS. 1 and 2.

FIG. 5 is a front plan diagram of an exemplary mask 120 suitable for use with the subject invention. The exemplary mask 120 is made from a flat, opaque metal foil having a pattern of open apertures 510, each aperture having a diameter D and a linear separation between apertures of L. The laser beam passes through the apertures 510 but is otherwise blocked by the mask 120. In the exemplary embodiment, the apertures 510 have a diameter of between 10 $\mu$, and 100-$\mu$m with 100 to 5000 holes formed in a mask that is between 1 and 2 mm square and 10 to 15 $\mu$m thick. This mask, when imaged by the lens system 125, 127, produces holes on the workpiece having diameters between 1 $\mu$m and 10 $\mu$m. In the exemplary mask, the apertures 510 are formed in a hexagonal pattern having a width W to minimize the amount of the laser light that is blocked when a circular beam is projected onto the mask.

Figure 6:
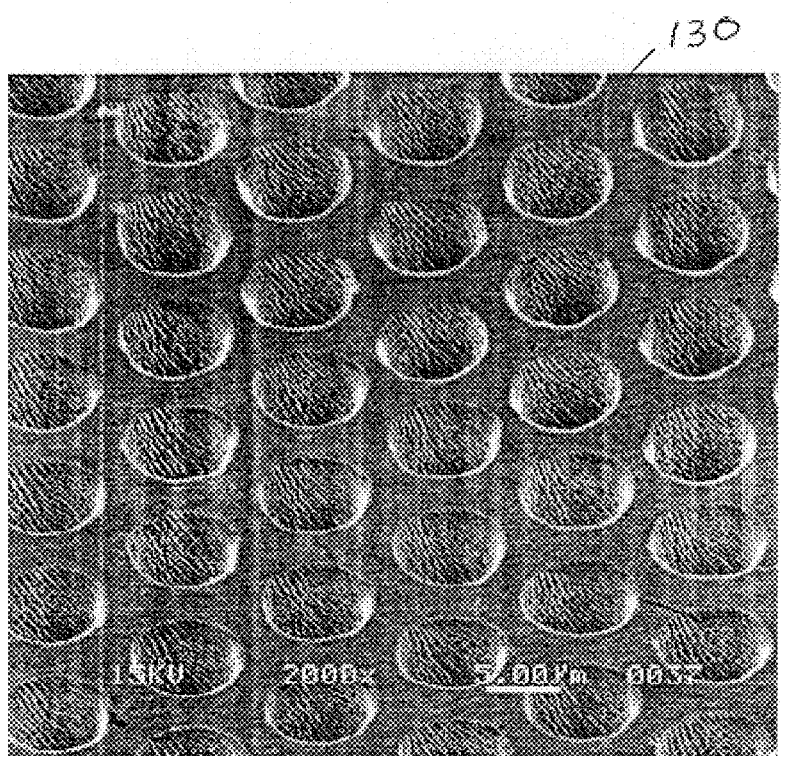
FIG. 6 is a photomicrograph of a microcavity array made with an embodiment of the present invention.
Figure 7:
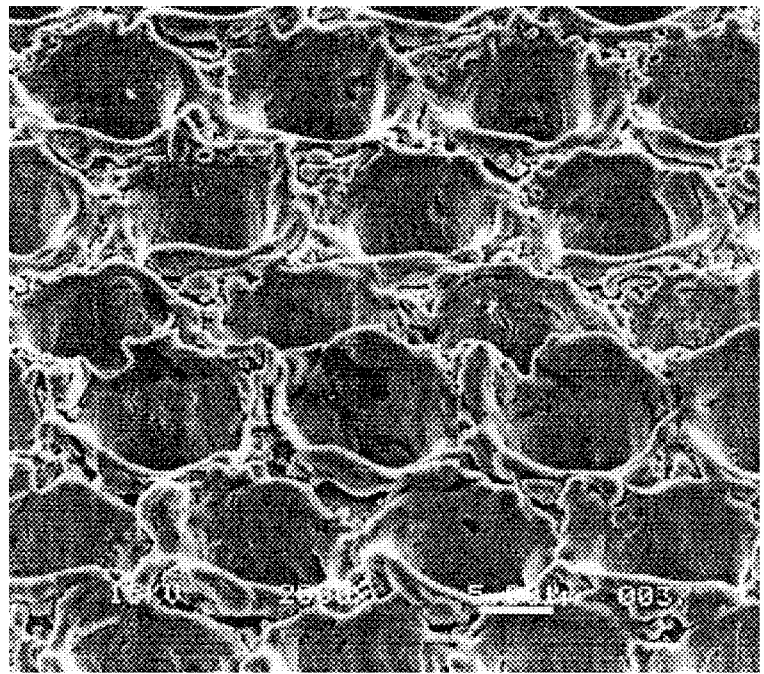
FIG. 7 is a photomicrograph of a microcavity array made with an excimer laser.

One embodiment of the subject invention uses laser pulses having ultrashort duration to produce an array of micrometer size holes in metal materials. The ultrashort pulse duration minimizes any heat-affected zone surrounding the holes and, thus, any melting during the drilling operation. The result is clean, high quality holes in the metal. FIGS. 6 and 7 compare holes drilled in a tungsten foil using the exemplary ultrashort laser to holes drilled using the exemplary excimer laser. As can be seen from FIG. 6, the holes drilled with the ultrashort pulses are substantially free of melted metal, resulting in a clean, highly regular array of microcavity holes. The holes shown in FIG. 7, which were drilled using the excimer laser exhibit a considerable amount of melting. The melt recast makes the holes not clean and irregular.

A number of improvements may be made to the systems described above to further improve the quality of the drilled holes. For example, a telecentric lens may be used instead of the microscope objective 126 or the lens 127 to improve the straightness of the hole through the foil. In addition, a rotating half-wave plate or similar device may be used to improve the circularity of the exit holes and possibly reduce the taper of the holes.

While the invention has been described in terms of three exemplary embodiments, it is contemplated that it may be practiced as outlined above within the scope of the appended claims.

What is claimed:

1. Apparatus for forming an array of microcavities on a workpiece having a surface, the apparatus comprising:

a laser which produces a beam of laser light pulses;

beam dividing means for dividing the beam of laser light pulses into multiple beams; and a lens system that magnifies the multiple beams by a magnification factor that is less than 1 and focuses the multiple beams onto the surface of the workpiece to cause material to be removed from the workpiece forming the microcavity array.

2. Apparatus according to claim 1, wherein the lens system includes a first lens and a second lens each having a front focal plane and a back focal plane the first lens being positioned such that the beam dividing apparatus provides an image of the divided beam at the front focal plane of the first lens and the second lens being positioned such that the surface of the workpiece is at the back focal plane of the second lens.

3. Apparatus for forming an array of microcavities on a workpiece having a surface, the apparatus comprising:

laser which produces a beam of laser light pulses;

beam dividing means for dividing the beam of laser light pulses into multiple beams; and a lens system that magnifies the multiple beams by a magnification factor that is less than 1 and focuses the multiple beams onto the surface of the workpiece to cause material to be removed from the workpiece forming the microcavity array, the lens system including;

a first lens having a front focal plane and a back focal plane, the first lens being positioned such that the beam dividing apparatus provides an image of the divided beam at the front focal plane of the first lens; and a second lens having a front focal plane and a back focal plane, the second lens being positioned such that the surface of the workpiece is at the back focal plane of the second lens.

4. Apparatus according to claim 3, wherein the laser is an ultrashort pulse laser.

5. Apparatus according to claim 4, wherein the ultrashort pulse laser produces laser pulses having a first intensity at the beam dividing means that is not sufficient to cause laser ablation and an intensity at the workpiece that is sufficient to cause laser ablation.

6. Apparatus according to claim 3, wherein the laser is an excimer laser.

7. Apparatus according to claim 3, wherein each of the first and second lenses has a respective focal length and the ratio of the focal length of the second lens to the focal length of the first lens is approximately 1 to 10 providing a magnification factor of 0.1.

8. Apparatus according to claim 3, wherein the beam dividing apparatus is an opaque mask having a pattern of openings.

9. A Apparatus according to claim 8, wherein the pattern of openings in the opaque mask has a hexagonal outline.

10. Apparatus according to claim 3, wherein the beam dividing apparatus is a diffractive optical element.

11. Apparatus according to claim 3, further including a quarter wave plate that converts the beam of laser light pulses into a beam of circularly polarized laser light pulses.

12. Apparatus according claim 3, further including beam homogenizing apparatus that homogenizes the laser light pulses in intensity before the laser light beams are applied to the workpiece.

13. Apparatus according to claim 12, wherein the beam homogenizing apparatus includes:
   a turning mirror having a reflecting surface configured to reflect the laser light beam provided by the ultrashort laser toward the beam dividing apparatus and tilted to provide a central axis of the ultrashort laser beam at a location displaced from a central point on the beam dividing apparatus; and
   a motor coupled to rotate the turning mirror about an axis perpendicular to the reflecting surface of the mirror.

14. Apparatus for forming an array of microcavities on a workpiece having a surface, the apparatus comprising:
   a laser which produces a beam of laser light pulses;
   beam dividing means for dividing the beam of laser light pulses into multiple beams, each of the multiple beams having a diameter; and
   a lens system that focuses the multiple beams onto the surface of the workpiece, reducing the diameter of each beam of the multiple beams to cause material to be removed from the workpiece forming the microcavity array.

15. Apparatus according to claim 14, wherein the lens system includes a first lens and a second lens each having a front focal plane and a back focal plane the first lens being positioned such that the beam dividing apparatus provides an image of the divided beam at the front focal plane of the first lens and the second lens being positioned such that the surface of the workpiece is at the back focal plane of the second lens.

16. Apparatus for forming an array of microcavities on a workpiece having a surface, the apparatus comprising:
   a laser which produces a beam of laser light pulses;
   beam dividing means for dividing the beam of laser light pulses into multiple beams, each of the multiple beams having a diameter; and
   a lens system that focuses the multiple beams onto the surface of the workpiece, reducing the diameter of each beam of the multiple beams to cause material to be removed from the workpiece forming the microcavity array, the lens system including;
      a first lens having a front focal plane and a back focal plane, the first lens being positioned such that the beam dividing apparatus provides an image of the divided beam at the front focal plane of the first lens; and
      a second lens each having a front focal plane and a back focal plane; the second lens being positioned such that the surface of the workpiece is at the back focal plane of the second lens.

17. Apparatus according to claim 16, wherein the laser is an ultrashort laser.

18. Apparatus according to claim 16, wherein the beam dividing means is an opaque mask having a pattern of openings and the laser is controlled in intensity to produce essentially no ablation at the opaque mask while producing ablation at the workpiece.

19. Apparatus according to claim 16, wherein each of the first and second lenses has a respective focal length and the ratio of the focal length of the second lens to the focal length of the first lens is approximately 1 to 10 providing a magnification factor of 0.1.

20. Apparatus according to claim 16, wherein the beam dividing means is a diffractive optical element.

21. Apparatus for forming an array of microcavities on a workpiece having a surface, the apparatus comprising:
   a laser which produces a beam of laser light pulses;
   an opaque mask having a pattern of openings with a hexagonal outline for dividing the beam of laser light pulses into multiple beams; and
   a lens system that magnifies the multiple beams by a magnification factor that is less than 1 and focuses the multiple beams onto the surface of the workpiece to cause material to be removed from the workpiece forming the microcavity array.

22. Apparatus for forming an array of microcavities on a workpiece having a surface, the apparatus comprising:
   laser which produces a beam of laser light pulses;
   a diffractive optical element for dividing the beam of laser light pulses into multiple beams; and
   a lens system that magnifies the multiple beams by a magnification factor that is less than 1 and focuses the multiple beams onto the surface of the workpiece to cause material to be removed from the workpiece forming the microcavity array.

23. Apparatus for forming an array of microcavities on a workpiece having a surface, the apparatus comprising:
   a laser which produces a beam of laser light pulses;
   a diffractive optical element for dividing the beam of laser light pulses into multiple beams, each of the multiple beams having a diameter; and
   a lens system that focuses the multiple beams onto the surface of the workpiece, reducing the diameter of each beam of the multiple beams to cause material to be removed from the workpiece forming the microcavity array.

* * * * *